United States Patent
Foladare et al.

(10) Patent No.: US 6,330,322 B1
(45) Date of Patent: Dec. 11, 2001

(54) METHOD AND APPARATUS FOR UPDATING REVERTIVE TELEPHONE NUMBERS

(75) Inventors: Mark Jeffrey Foladare, Kendall Park; Shelley B. Goldman, East Brunswick; Shaoqing Q. Wang; Robert S. Westrich, both of Middletown, all of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/153,221

(22) Filed: Sep. 14, 1998

(51) Int. Cl.[7] ..................................................... H04M 3/42
(52) U.S. Cl. ................. 379/211.01; 379/201.02; 379/211.02
(58) Field of Search .......................... 379/210.01–210.03, 379/211.01–211.05, 212.01, 213.01, 202.01, 215.01, 201.01–201.12, 114.01–114.29

(56) References Cited

U.S. PATENT DOCUMENTS

| | | | |
|---|---|---|---|
| 4,313,035 | * | 1/1982 | Jordan ................................... 379/211 |
| 5,243,645 | * | 9/1993 | Bissell et al. .......................... 379/211 |
| 5,592,541 | * | 1/1997 | Fleischer, III et al. .............. 379/211 |
| 5,724,417 | * | 3/1998 | Bartholomew et al. ............. 379/211 |
| 6,072,865 | * | 6/2000 | Haber et al. .......................... 379/211 |

\* cited by examiner

Primary Examiner—Ahmad Matar
Assistant Examiner—Benny Q. Tieu

(57) ABSTRACT

A method and apparatus is provided for updating the telephone number in a subscriber's profile to the telephone number at the subscriber's current location based on a revertive call. When a revertive call is received by a system from a subscriber, the subscriber's number is identified and compared to a default number in the subscriber's profile. The call is connected and the system checks whether the telephone number is the same as the number stored in the subscriber's profile. If the subscriber's number is different than the number stored in the subscriber's profile, after the call is terminated, the system queries the subscriber as to whether the subscriber would like to have calls forwarded to his or her current telephone number for a particular length of time. If the subscriber indicates that he or she would like to have calls forwarded to his or her current telephone number for a particular period of time, the subscriber's telephone number will be stored in the subscriber's profile so that future pages or calls will be forwarded to that number for the prescribed period, thus obviating the need for the subscriber to constantly place revertive calls from the same location.

18 Claims, 4 Drawing Sheets

METHOD AND APPARATUS FOR UPDATING REVERTIVE TELEPHONE NUMBERS

BACKGROUND OF THE INVENTION

1. Field of Invention

This invention relates to the routing of calls in a communications network. In particular, this invention is directed to the updating of a subscriber's current telephone number in response to a revertive call being placed by a subscriber from a particular location.

2. Description of Related Art

Communications systems exist in which a first party may attempt to contact a system subscriber at several locations. If the subscriber cannot be reached, the system may then send a page to the subscriber's pager and wait for the subscriber to place a revertive call into the system. The system may then bridge the first party's call to the subscriber.

However, if a subscriber is consistently at different locations which may be unpredictable, the subscriber will have to constantly make revertive calls in response to pages relayed by the system instead of having the calls directly routed. Thus, there is currently no convenient method for a subscriber to update his or her location, so that repetitive revertive calls from the same location may be avoided.

SUMMARY OF THE INVENTION

A method and apparatus is provided for updating the telephone number in a subscriber's profile to the telephone number of the subscriber's current location based on a revertive call. When a revertive call is received by a system from a subscriber, the subscriber's number is identified and compared to a default number in the subscriber's profile. The call is connected and the system checks whether the telephone number is the same as the number stored in the subscriber's profile. If the subscriber's number is different than the number stored in the subscriber's profile, after the call is terminated, the system queries the subscriber as to whether the subscriber would like to have calls forwarded to his or her current telephone number for a particular length of time. If the subscriber indicates that he or she would like to have calls forwarded to his or her current telephone number for a particular period of time, the subscriber's telephone number will be stored in the subscriber's profile so that all future pages or calls will be forwarded to that number, thus obviating the need for the subscriber to constantly place revertive calls from the same location.

BRIEF DESCRIPTION OF THE DRAWINGS

The invention is described in detail with reference to the following drawings, wherein like numerals represent like elements, and wherein.

DETAILED DESCRIPTION OF PREFERRED EMBODIMENTS

Figure 1:
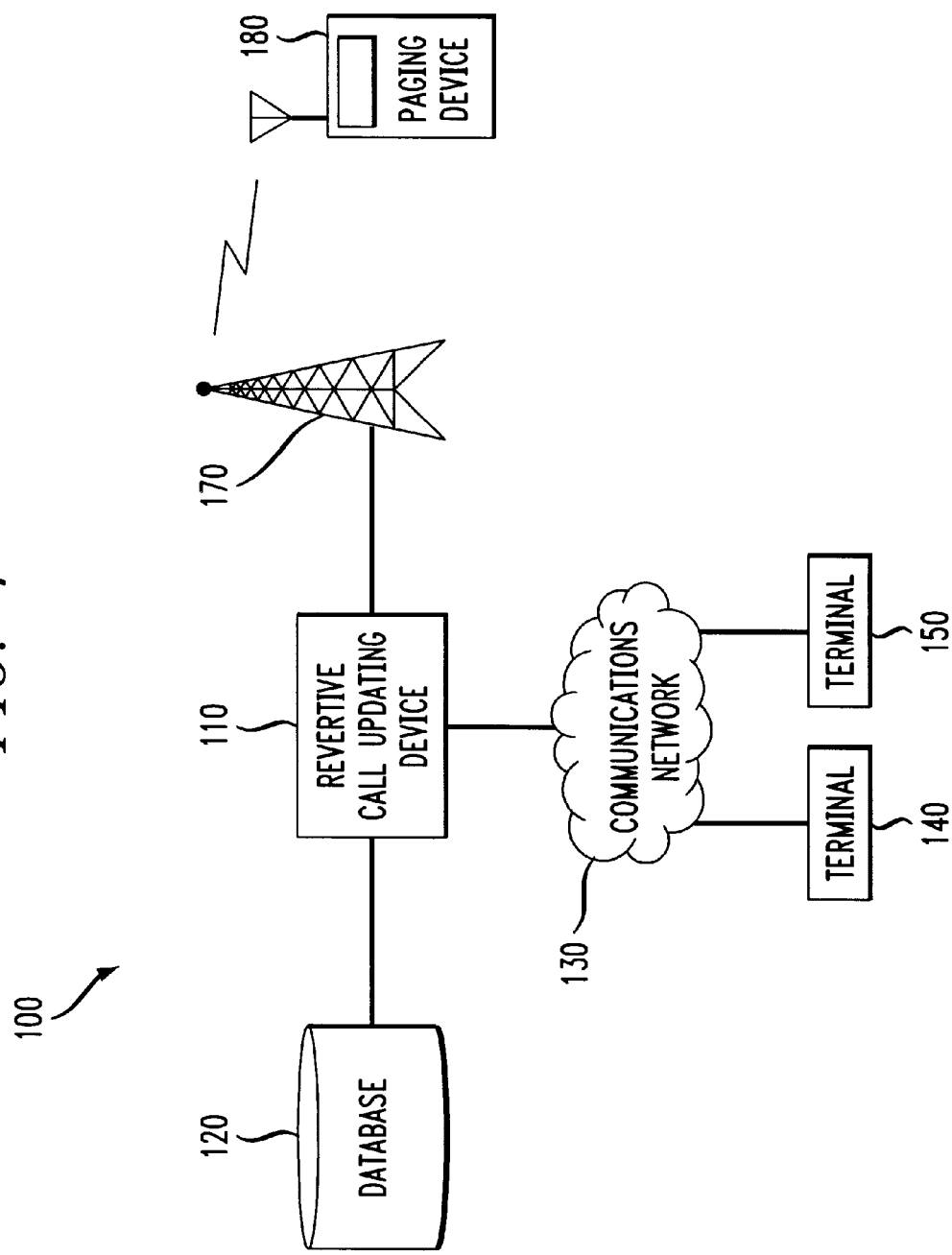
FIG. 1 is a block diagram of an exemplary revertive call updating system.

FIG. 1 shows an exemplary embodiment of a revertive call updating system 100 that includes a communication network 130 connected to communication terminals 140 and 150. The communication terminals 140 and 150 may represent telephone stations, personal computers, or any other device which may send and receive communications. The communications network 130 is also coupled to a revertive call updating device 110. When distributed, local exchange carriers or servers of the communications network 130 interface with the terminals 140 and 150 and service control units of the revertive call updating device 110, performing all of its functions. For ease of discussion in the following description, the revertive call updating device 110 is assumed to be centralized.

The revertive call updating device 110 is connected to a database 120. The database 120 can be stored on any memory device internal or external to the revertive call updating device 110. The revertive call updating device 110 is coupled to a wireless communications tower, such as pager tower 170, or a mobile base station for cellular phones which provides broadcasting capabilities to wirelessly communicate with portable communication devices, such as pager 180.

A first party uses terminal 140 in an attempt to contact a second party at terminal 150 through communications network 130. When the second party at terminal 150 attempts to bridge the call, the revertive call updating device 110 receives the call from the communications network 130 and queries the database 120 to determine whether the second party is a subscriber. If the second party is not a subscriber, the revertive call updating device 110 connects the terminals 140 and 150 together through the communications network 130 so that other system features subscribed to by either party may be performed, for example.

If the second party is a subscriber, the revertive call updating device 110 identifies the subscriber's telephone number from an Automatic Number Identification (ANI) device, for example, and retrieves the subscriber's profile information from the database 120. The revertive call updating device 110 then connects the terminals 140 and 150 together through communications network 130. After the call is connected, the revertive call updating device 110 determines whether the subscriber's telephone number is the same as the number stored in the subscriber's profile. If the subscriber's telephone number is different than the number stored in the subscriber's profile, and once the connection between terminals 140 and 150 is terminated, the revertive call updating device 110 queries the subscriber whether he or she wants to be contacted with any calls or pages at the subscriber's current telephone number. If the subscriber indicates that he or she wishes to be contacted at his or her current telephone number, the telephone number is stored in the subscriber's profile in the database 120.

Figure 2:
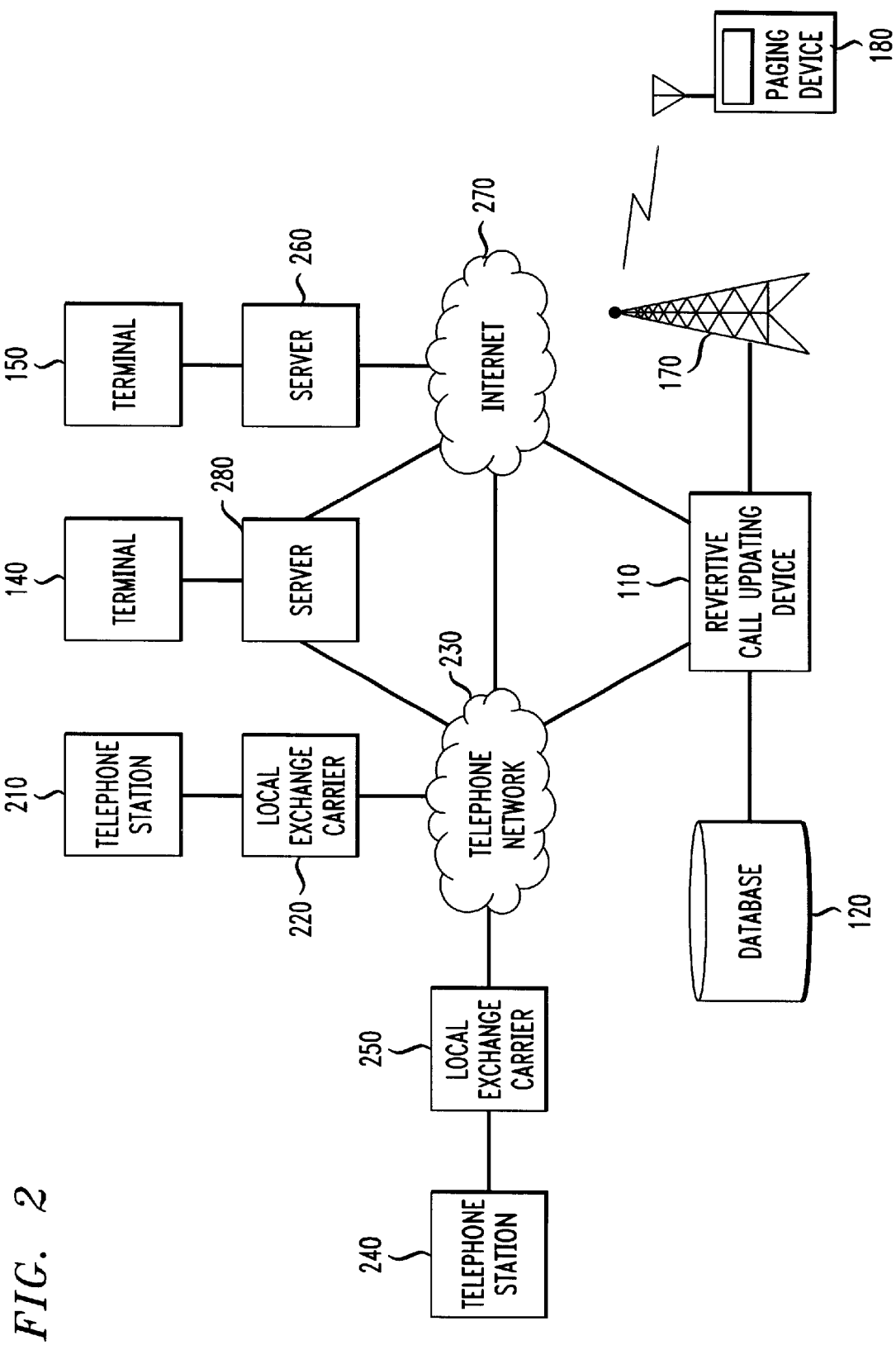
FIG. 2 is a specific example of the revertive call updating device shown in FIG. 1.

FIG. 2 shows a specific example of the revertive call updating system 100 shown in FIG. 1. Telephone network 230 is connected to telephone stations 210 and 240 via local exchange carriers 220 and 250, respectively. The local exchange carriers 220 and 250 include well known switching technologies for connecting and routing calls (i.e., the Lucent Technologies' 5ESS switch). The telephone network 230 is also coupled to the revertive call updating device 110, to the terminal 140 via server 280, and to the Internet 270.

The revertive call updating device 110 is connected to a database 120 and is also coupled to a wireless communications tower, such as pager tower 170, or a mobile base station which provides broadcasting capabilities to wirelessly communicate with portable communication devices, such as a pager 180. The revertive call updating device 110 is further connected to the Internet 270. The Internet 270 is connected to terminals 140 and 150 through servers 280 and 260, respectively.

When a caller, using telephone station 210, calls a subscriber at the telephone station 240, for example, the call is routed through the telephone network 230 and the revertive call updating device 110. The revertive call updating device 110 receives the call from the subscriber and identifies the subscriber's telephone number. The revertive call updating device 110 gets the subscriber's profile from the database 120, and then connects the call between telephone stations 210 and 240 through telephone network 230.

The revertive call updating device 110 determines whether the number the subscriber was calling from matches any of the default telephone numbers in the subscriber's profile to which the subscriber had previously requested the calls be forwarded. If the subscriber's current telephone number is different than any of the default telephone number in the subscriber's profile, the revertive call updating device 110 monitors the connection between the first party's telephone station 210 and the subscriber's telephone station 240 to determine when the connection is terminated.

When the connection is terminated, the revertive call updating device 110 queries the subscriber at telephone station 240 through the telephone network 230 and the local exchange carrier 220 as to whether the subscriber wants to be contacted at his or her current telephone number. If the subscriber decides not to be contacted at his or her current telephone number, the revertive call updating device 110 will continue to attempt to contact the subscriber at the default telephone number indicated in the subscriber's profile. However, if the subscriber wants to be contacted at his or her current telephone number, the revertive call updating device 110 may also ask for how long the current number is to be used, for example, and then store the subscriber's current telephone number and any additional information to the subscriber's profile in the database 120.

Alternatively, a first party may be using computer terminal 140 and attempt to contact the subscriber at terminal 150 through the Internet 270 and the revertive call updating device 110. When the subscriber at terminal 150 attempts to respond to a call or a page, the subscriber at terminal 150 calls the revertive call updating device 110. The revertive call updating device 110 identifies the IP address that the subscriber's terminal 150 is using, and retrieves the subscriber's profile information to determine whether the subscriber is at a terminal connected to a default IP address. The revertive call updating device 110 then connects the subscriber at terminal 150 to the first party at terminal 140 to the Internet 270 and servers 260 and 280 respectively. Once the connection between terminals 140 and 150 is terminated, the revertive call updating device 110 may query the subscriber at terminal 150 either audibly or through a text message, for example, through the Internet 270, as to whether the subscriber would like to be contacted at the IP address for the terminal 150. If the subscriber would like to be contacted at the IP address for terminal 150, the revertive call updating device 110 stores the IP address in the subscriber's profile in database 120.

Furthermore, the invention may be applied to other communication devices. For example, the revertive call updating device 110 may update the subscriber's current telephone number or other unique identifier as a mobile paging device 180 through paging tower 170, or a facsimile (not shown). For example, the unique identifier may be a CAPCODE, PIN number, IP address, etc.

Figures 3, 4:
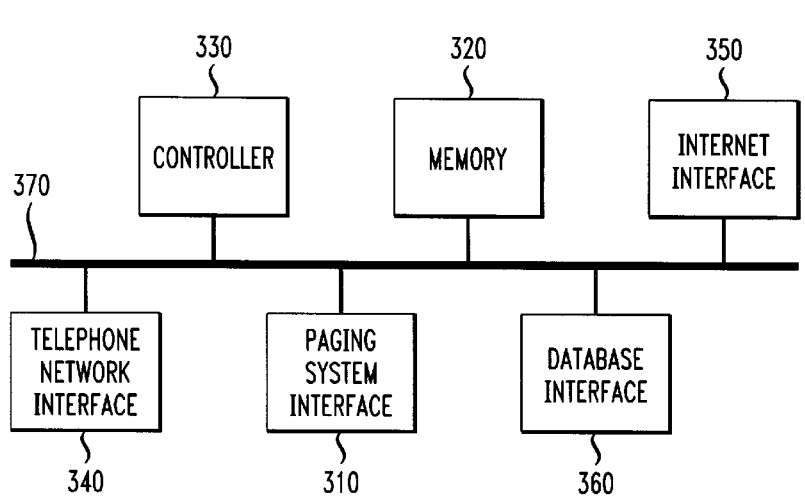
FIG. 3 is a block diagram of the revertive call updating device.
FIG. 4 is a diagram illustrating a sample subscriber profile information for the revertive call updating device.

FIG. 3 is a block diagram of the revertive call updating device 110. The revertive call updating device 110 may include a controller 330, a memory 320, a telephone network interface 340, an Internet interface 350, a paging system interface 310, and a database interface 360, coupled together by a signal bus 370. The above elements of the revertive call updating device 110 may be found as part of a single standalone unit or may be distributed as part of a local exchange carrier or server, for example.

When a caller calls a subscriber, the call is received by the controller 330 through the telephone network interface 340. The controller 330 identifies the telephone number being used by the subscriber and retrieves the subscriber profile information corresponding to the subscriber from either the memory 320 or an external database through the database interface 360.

The controller 330 then connects the subscriber's call through the telephone network interface 340 (or the Internet interface 350 if the subscriber is at a terminal, for example). The controller 330 determines whether the telephone number used by the subscriber is the same as the number stored in the subscriber's profile. If the telephone number used by the subscriber is different than the number stored in the subscriber's profile, the controller 330 monitors the subscriber's call through the telephone network interface 340. Once the controller 330 determines that the subscriber's telephone call has been terminated, the controller 330 solicits the subscriber via the telephone network interface 340 as to whether the subscriber would like to be contacted at his or her current telephone number. If the subscriber indicates that he or she would like to be contacted at that current telephone number, the controller 330 stores that number into the subscriber's profile located in the memory 320 or in the external database through the database interface 360.

FIG. 4 illustrates a sample of the subscriber profile 400 information which may be stored in database 120. For example, the subscriber profile 400 may include the subscriber's ID number 410, one or more default telephone numbers 420 at which the revertive call updating device 110 would normally contact the subscriber, the subscriber's current telephone number 430 and how long the subscriber will be at the current telephone number.

In this manner, the subscriber can give the revertive call updating device 110 several customized options on how he or she may be notified so that vital pages or calls will not be missed or delayed. For example, if the subscriber indicates that he or she will be at a current telephone number for a set time period, the revertive call updating device 110 will attempt to contact the subscriber during that time period at the current telephone number. In this instance, the revertive call updating device 110 may decrement a counter, or use an internal clock to determine when this time expires, for example. When the time expires or a particular clock time is reached, the revertive call updating device 110 will revert to contacting the subscriber at the default numbers 420.

Figure 5:
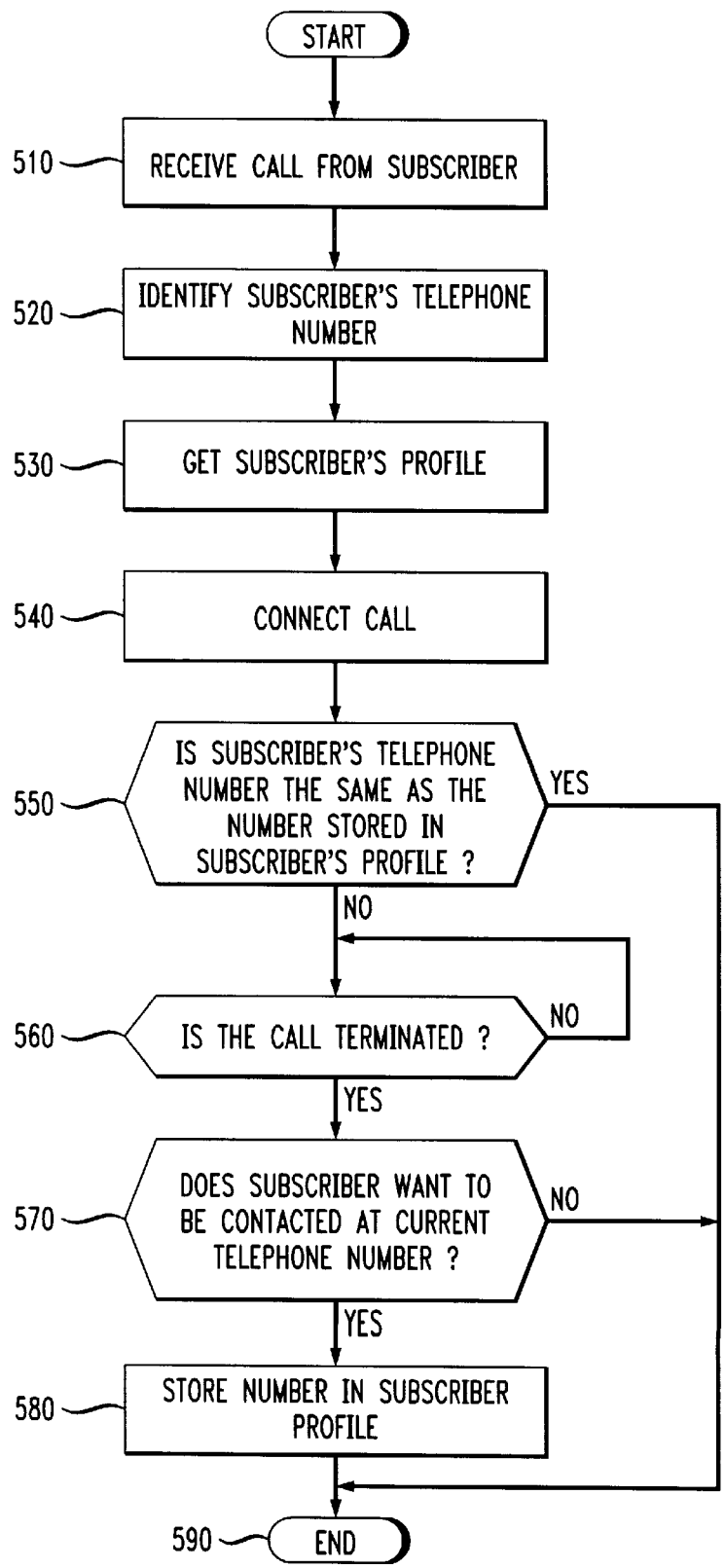
FIG. 5 is a flowchart of the revertive call updating device process.

FIG. 5 is a flowchart describing the revertive call updating process. At step 510, the controller 330 receives a call from a subscriber attempting to bridge a call from a calling party, for example. At step 520, the controller 330 identifies the number the subscriber is calling from and goes to step 530. At step 530, the controller 330 gets the subscriber's profile from the memory 320, goes to step 540, and connects the call between the subscriber and the calling party.

Then, at step 550, the controller 330 compares the subscriber's telephone number with the telephone number stored in the subscriber's profile. If the numbers are different, the process goes to step 560 and waits for the call between the subscriber and the first party to be terminated. Once the call between the subscriber and the calling party is terminated, at step 570, the controller 330 queries the subscriber whether he or she wants to be contacted at the current telephone number. If the subscriber does not want to be contacted at the current telephone number, the controller 330 goes to step 590 and ends. However, if the subscriber wants to be contacted at the current telephone number, the controller 330 goes to step 580 and stores the subscriber's current telephone number in the subscriber profile, and then goes to step 590 and ends.

The revertive call updating device 110 may be implemented on a programmed general purpose computer. However, the revertive call updating device 110 may also be implemented on a special purpose computer, a program microprocessor or microcontroller and peripheral integrated circuit elements, an Application Specific Integrated Circuits (ASIC) or other integrated circuits, a hardwired electronic or logic circuit, such as a discrete element circuit, a programmable logic device, such as a PLD, a PLA, FGPA, or PAL, or the like. Furthermore, the functions of the revertive call updating device 110 may be performed by a standalone unit or distributed throughout the communications network 130. In general, any device with a finite state machine capable of performing the functions of the revertive call updating device 110, as described herein, can be implemented.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as described in the following claims.

What is claimed is:

1. A method for facilitating communication between a calling party and a subscriber in a communications network, comprising:

receiving a call from the subscriber;

identifying a telephone number used by the subscriber in the call as the subscriber's current telephone number;

connecting the subscriber and the calling party in a call;

comparing the subscriber's current telephone number with a telephone number stored in a subscriber's profile; and querying the subscriber after the call has been terminated as to whether the subscriber wants the subscriber's current telephone number, if different than the telephone number stored in the subscriber's profile, to be now stored in the subscriber's profile.

2. The method of claim 1, further comprising:

receiving a call from a second calling party; and connecting the subscriber and the second calling party using the subscriber's current telephone number.

3. The method of claim 1, further comprising:

querying the subscriber as to how long the subscriber would like calls to be routed to the subscriber's current telephone number.

4. The method of claim 3, further comprising:

setting a counter based on a length of time provided by the subscriber;

decrementing the counter; and routing calls to the telephone number stored in the subscriber's profile, when the counter equals zero.

5. The method of claim 1, wherein the receiving step receives the subscriber's call from a computer terminal and the subscriber's current telephone number corresponds to an IP address.

6. The method of claim 1, further comprising:

storing the subscriber's current telephone number in the subscriber's profile.

7. An apparatus for facilitating communication between a calling party and a subscriber in a communications network, comprising:

a database;

a controller coupled to the database that receives a call from the subscriber, identifies a telephone number used by the subscriber in the call as the subscriber's current telephone number, connects the subscriber and the calling party in a call; compares the subscriber's current telephone number with a telephone number stored in a subscriber's profile; and queries the subscriber after the call has been terminated as to whether the subscriber wants the subscriber's current telephone number in the database, if different than the telephone number stored in the subscriber's profile, to be now stored in the subscriber's profile.

8. The apparatus of claim 7, wherein the controller receives a call from a second calling party, and connects the subscriber and the second calling party using the subscriber's current telephone number.

9. The apparatus of claim 7, wherein the controller queries the subscriber as to how long the subscriber would like calls to be routed to the subscriber's current telephone number.

10. The apparatus of claim 9, wherein the controller sets a counter based on a length of time provided by the subscriber, decrements the counter, and routes calls to the telephone number stored in the subscriber's profile, when the counter equals zero.

11. The apparatus of claim 7, wherein the controller receives the subscriber's call from a computer terminal and the subscriber's current telephone number corresponds to an IP address.

12. The apparatus of claim 7, wherein the controller stores the subscriber's current telephone number in the subscriber's profile.

13. An apparatus for facilitating communication between a calling party and a subscriber in a communications network, comprising:

receiving means for receiving a call from the subscriber;

identifying means for identifying a telephone number used by the subscriber in the call as the subscriber's current telephone number;

connecting means for connecting the subscriber and the calling party in a call;

comparing means for comparing the subscriber's current telephone number with a telephone number stored in a subscriber's profile; and querying means for querying the subscriber after the call has been terminated as to whether the subscriber wants the subscriber's current telephone number, if different than the telephone number stored in the subscriber's profile, to be now stored in the subscriber's profile.

14. The apparatus of claim 13, wherein the receiving means receives a call from a second calling party, and the connecting means connects the subscriber and the second calling party using the subscriber's current telephone number.

15. The apparatus of claim 13, wherein the querying means queries the subscriber as to how long the subscriber would like calls to be routed to the subscriber's current telephone number.

16. The apparatus of claim 15, further comprising:

setting means for setting a counter based on a length of time provided by the subscriber;

decrementing means for decrementing the counter; and routing means for routing calls to the telephone number stored in the subscriber's profile, when the counter equals zero.

17. The apparatus of claim 13, wherein the receiving means receives the subscriber's call from a computer terminal and the subscriber's current telephone number corresponds to an IP address.

18. The apparatus of claim 13, further comprising: storing means for storing the subscriber's current telephone number in the subscriber's profile.

* * * * *